(12) United States Patent
Ray et al.

(10) Patent No.: US 9,031,207 B2
(45) Date of Patent: May 12, 2015

(54) SYSTEM AND METHOD FOR PROVIDING LOCATION INFORMATION FOR ADDRESSED BASED E-911 CALLS TO PUBLIC SAFETY ANSWERING POINTS

(75) Inventors: Amar N. Ray, Shawnee, KS (US); Cadathur V. Chakravarthy, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1507 days.

(21) Appl. No.: 11/640,714

(22) Filed: Dec. 18, 2006

(65) Prior Publication Data

US 2008/0144779 A1    Jun. 19, 2008

(51) Int. Cl.
*H04M 11/04* (2006.01)
*H04L 12/66* (2006.01)

(52) U.S. Cl.
CPC ..................................... *H04L 12/66* (2013.01)

(58) Field of Classification Search
USPC ................ 379/25, 37, 45, 142.1, 221.02, 272
See application file for complete search history.

(56) References Cited

U.S. PATENT DOCUMENTS

| | | | |
|---|---|---|---|
| 5,339,351 A | 8/1994 | Hoskinson et al. | |
| 5,379,337 A | 1/1995 | Castillo et al. | |
| 5,497,149 A | 3/1996 | Fast | |
| 5,555,286 A | 9/1996 | Tendler | |
| 5,646,987 A | 7/1997 | Gerber et al. | |
| 6,137,877 A | 10/2000 | Robin et al. | |
| 6,240,285 B1 | 5/2001 | Blum et al. | |
| 6,317,049 B1 | 11/2001 | Toubia et al. | |
| 6,366,772 B1 | 4/2002 | Arnson | |
| 6,415,018 B1 | 7/2002 | Antonucci et al. | |
| 6,480,578 B1 | 11/2002 | Allport | |
| 6,526,125 B1 | 2/2003 | Lindsay et al. | |
| 6,591,112 B1 | 7/2003 | Siccardo et al. | |
| 6,642,844 B2 | 11/2003 | Montague | |
| 6,678,357 B2 * | 1/2004 | Stumer et al. | 379/45 |
| 6,690,932 B1 | 2/2004 | Barnier et al. | |
| 6,771,163 B2 | 8/2004 | Linnett et al. | |
| 6,839,022 B1 | 1/2005 | Benco et al. | |
| 7,026,925 B2 | 4/2006 | Roche et al. | |
| 7,079,627 B2 * | 7/2006 | Crago et al. | 379/45 |
| 7,095,733 B1 * | 8/2006 | Yarlagadda et al. | 370/352 |
| 7,098,787 B2 * | 8/2006 | Miller | 340/539.18 |
| 7,231,218 B2 | 6/2007 | Diacakis et al. | |
| 7,269,413 B2 | 9/2007 | Kraft | |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Yosef K Laekemariam
(74) *Attorney, Agent, or Firm* — Swanson & Bratschun, L.L.C.

(57) ABSTRACT

A system and method for communicating location information of a VoIP subscriber to a public-safety answering point may include receiving an E-911 telephone call from a VoIP telephone. Location information associated with the VoIP telephone stored in a database may be requested. The location information may be received in a signal formatted substantially the same as a signal format for communicating caller identification information. The location information may be displayed at a public-safety answering point. In one embodiment, the location information may be displayed on a video display.

16 Claims, 6 Drawing Sheets

(56) References Cited

U.S. PATENT DOCUMENTS

| | | | |
|---|---|---|---|
| 7,342,917 B2 | 3/2008 | Mohan et al. | |
| 7,386,103 B1* | 6/2008 | Chahal | 379/88.23 |
| 7,418,087 B2* | 8/2008 | Luneau et al. | 379/88.21 |
| 7,496,189 B2 | 2/2009 | Clarisse et al. | |
| 7,574,194 B2 | 8/2009 | Yang et al. | |
| 7,679,505 B1 | 3/2010 | Vallaire | |
| 7,706,356 B1* | 4/2010 | Olshansky et al. | 370/352 |
| 7,734,019 B1 | 6/2010 | Terpstra | |
| 7,773,975 B2 | 8/2010 | Snapp et al. | |
| 7,843,903 B2 | 11/2010 | Bakke et al. | |
| 7,920,679 B1 | 4/2011 | Naim et al. | |
| 7,991,135 B2 | 8/2011 | Rauba et al. | |
| 8,014,341 B1 | 9/2011 | Ray | |
| 8,102,986 B1 | 1/2012 | McClintock et al. | |
| 8,295,801 B2 | 10/2012 | Ray et al. | |
| 8,320,871 B2 | 11/2012 | Ray et al. | |
| 8,364,113 B2 | 1/2013 | Ray et al. | |
| 8,447,267 B2 | 5/2013 | Ray et al. | |
| 8,615,214 B2 | 12/2013 | Jain et al. | |
| 8,630,609 B2 | 1/2014 | Ray et al. | |
| 8,712,366 B2 | 4/2014 | Greene et al. | |
| 8,718,595 B2 | 5/2014 | Ray et al. | |
| 8,891,749 B2 | 11/2014 | Geldbach et al. | |
| 8,923,803 B2 | 12/2014 | Ray et al. | |
| 8,964,945 B2 | 2/2015 | Ray | |
| 8,976,938 B2 | 3/2015 | Zerillo et al. | |
| 8,982,871 B2 | 3/2015 | Ray et al. | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0012323 A1 | 1/2002 | Petite et al. | |
| 2002/0016189 A1 | 2/2002 | Sheynblat et al. | |
| 2002/0054667 A1 | 5/2002 | Martinez | |
| 2002/0136363 A1 | 9/2002 | Stumer et al. | |
| 2003/0012344 A1 | 1/2003 | Agarwal et al. | |
| 2003/0063714 A1 | 4/2003 | Stumer et al. | |
| 2003/0109245 A1 | 6/2003 | McCalmont et al. | |
| 2003/0133450 A1 | 7/2003 | Baum | |
| 2003/0158668 A1 | 8/2003 | Anderson | |
| 2004/0072583 A1 | 4/2004 | Weng | |
| 2004/0077347 A1* | 4/2004 | Lauber et al. | 455/428 |
| 2004/0090950 A1 | 5/2004 | Lauber et al. | |
| 2004/0176123 A1 | 9/2004 | Chin et al. | |
| 2004/0257273 A1 | 12/2004 | Benco et al. | |
| 2005/0002499 A1 | 1/2005 | Ordille et al. | |
| 2005/0003797 A1 | 1/2005 | Baldwin | |
| 2005/0070315 A1 | 3/2005 | Rai et al. | |
| 2005/0101287 A1 | 5/2005 | Jin et al. | |
| 2005/0111630 A1 | 5/2005 | Potorny et al. | |
| 2005/0123102 A1 | 6/2005 | Beason et al. | |
| 2005/0151642 A1 | 7/2005 | Tupler et al. | |
| 2005/0159132 A1 | 7/2005 | Wright et al. | |
| 2005/0169248 A1 | 8/2005 | Truesdale et al. | |
| 2005/0197096 A1 | 9/2005 | Yang et al. | |
| 2005/0201358 A1 | 9/2005 | Nelson et al. | |
| 2005/0209781 A1 | 9/2005 | Anderson | |
| 2005/0232225 A1 | 10/2005 | Pelaez et al. | |
| 2005/0265326 A1 | 12/2005 | Laliberte | |
| 2006/0009190 A1 | 1/2006 | Laliberte | |
| 2006/0043164 A1 | 3/2006 | Dowling et al. | |
| 2006/0052134 A1 | 3/2006 | Sato | |
| 2006/0072547 A1 | 4/2006 | Florkey et al. | |
| 2006/0133582 A1 | 6/2006 | McCulloch | |
| 2006/0217136 A1 | 9/2006 | Bantukul et al. | |
| 2006/0219542 A1 | 10/2006 | Savir | |
| 2006/0234726 A1 | 10/2006 | Ashley et al. | |
| 2006/0234727 A1 | 10/2006 | Ashley et al. | |
| 2006/0293024 A1 | 12/2006 | Benco et al. | |
| 2007/0003024 A1 | 1/2007 | Olivier et al. | |
| 2007/0041368 A1 | 2/2007 | Lorello et al. | |
| 2007/0064882 A1 | 3/2007 | Ger et al. | |
| 2007/0121851 A1 | 5/2007 | Maropis et al. | |
| 2007/0201391 A1 | 8/2007 | Belmonte et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0018452 A1 | 1/2008 | McCarthy et al. | |
| 2008/0026728 A1 | 1/2008 | Snapp et al. | |
| 2008/0064363 A1 | 3/2008 | Salafia et al. | |
| 2008/0064375 A1 | 3/2008 | Gottlieb | |
| 2008/0070546 A1 | 3/2008 | Lee | |
| 2008/0200143 A1 | 8/2008 | Qui et al. | |
| 2008/0261557 A1 | 10/2008 | Sim | |
| 2008/0273670 A1 | 11/2008 | Dickinson | |
| 2008/0304630 A1 | 12/2008 | Nguyen et al. | |
| 2009/0047924 A1 | 2/2009 | Ray et al. | |
| 2009/0086932 A1 | 4/2009 | Ray | |
| 2009/0097474 A1 | 4/2009 | Ray et al. | |
| 2009/0144260 A1 | 6/2009 | Bennett et al. | |
| 2009/0186596 A1 | 7/2009 | Kaltsukis | |
| 2009/0197567 A1 | 8/2009 | Ogram | |
| 2009/0214011 A1 | 8/2009 | Geldbach et al. | |
| 2009/0227225 A1 | 9/2009 | Mitchell et al. | |
| 2009/0305730 A1 | 12/2009 | Herz et al. | |
| 2009/0310602 A1 | 12/2009 | Olshansky et al. | |
| 2010/0002845 A1 | 1/2010 | Zerillo et al. | |
| 2010/0002846 A1 | 1/2010 | Ray et al. | |
| 2010/0003946 A1 | 1/2010 | Ray et al. | |
| 2010/0003947 A1 | 1/2010 | Ray et al. | |
| 2010/0003949 A1 | 1/2010 | Ray et al. | |
| 2010/0003954 A1 | 1/2010 | Ray et al. | |
| 2010/0003955 A1 | 1/2010 | Ray et al. | |
| 2010/0003961 A1 | 1/2010 | Ray et al. | |
| 2010/0098062 A1 | 4/2010 | Croak et al. | |
| 2010/0107192 A1 | 4/2010 | Sennett et al. | |
| 2010/0142386 A1 | 6/2010 | Snapp et al. | |
| 2010/0215153 A1 | 8/2010 | Ray et al. | |
| 2010/0291894 A1 | 11/2010 | Pipes | |
| 2011/0014923 A1 | 1/2011 | Krco et al. | |
| 2011/0096769 A1 | 4/2011 | Sim | |
| 2012/0214437 A1 | 8/2012 | Ray et al. | |
| 2012/0309340 A1 | 12/2012 | Ray | |
| 2013/0012156 A1 | 1/2013 | Ray et al. | |
| 2013/0059560 A1 | 3/2013 | Ray et al. | |
| 2013/0102269 A1 | 4/2013 | Ray et al. | |
| 2013/0217355 A1 | 8/2013 | Ray et al. | |
| 2013/0237181 A1 | 9/2013 | Ray | |

OTHER PUBLICATIONS

ANSI, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Response filed Nov. 2, 2010 for U.S. Appl. No. 11/891,784.

Federal Standard 1037C: Telecommunications: Glossary of Telecommunication Terms, National Communication System. Technology and Standards Division. Washington, DC; General Services Administration, Information Technology Service, 1996. pp. vii, A-28, H-7, O.

U.S. Appl. No. 12/391,503; Non Final Office Action dated Feb. 16, 2012; 9 pages.

U.S. Appl. No. 12/391,503; Final Rejection dated May 24, 2012; 19 pages.

U.S. Appl. No. 11/430,232; Notice of Allowance dated May 13, 2011; 12 pages.

(56) References Cited

OTHER PUBLICATIONS

U.S. Appl. No. 11/430,232; Issue Notification dated Aug. 17, 2011; 1 page.
U.S. Appl. No. 11/904,883; Non-Final Rejection dated Oct. 7, 2011; 19 pages.
U.S. Appl. No. 11/904,883; Final Rejection dated Apr. 27, 2012; 16 pages.
U.S. Appl. No. 12/257,424; Non-Final Rejection dated Jan. 31, 2012; 21 pages.
U.S. Appl. No. 12/257,424; Final Rejection dated Jul. 14, 2011; 19 pages.
U.S. Appl. No. 11/974,775; Notice of Allowance dated Apr. 27, 2012; 12 pages.
U.S. Appl. No. 11/974,775; Non-Final Rejection dated Nov. 7, 2011; 19 pages.
U.S. Appl. No. 11/974,775; Non-Final Rejection dated May 10, 2011; 24 pages.
U.S. Appl. No. 12/168,668; Non-Final Rejection dated Feb. 6, 2012; 21 pages.
U.S. Appl. No. 12/070,909; Final Rejection dated Jan. 10, 2012; 9 pages.
U.S. Appl. No. 12/070,909; Non-Final Rejection dated Aug. 16, 2011; 13 pages.
U.S. Appl. No. 12/257,574; Final Rejection dated Dec. 29, 2011; 18 pages.
U.S. Appl. No. 12/257,574; Non-Final Rejection dated Jul. 6, 2011; 20 pages.
U.S. Appl. No. 12/257,624; Final Rejection dated Jan. 31, 2012; 14 pages.
U.S. Appl. No. 12/257,624; Non-Final Rejection dated Oct. 6, 2011; 19 pages.
U.S. Appl. No. 12/257,641; Notice of Allowance dated Feb. 2, 2012; 12 pages.
U.S. Appl. No. 12/257,641; Non-Final Rejection dated May 24, 2011; 17 pages.
U.S. Appl. No. 12/257,928; Non-Final Rejection dated Jun. 8, 2011; 21 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 12/257,862; Final Rejection dated Nov. 30, 2011; 15 pages.
U.S. Appl. No. 12/257,862; Non-Final Rejection dated May 24, 2011; 19 pages.
U.S. Appl. No. 11/904,883; Non Final Rejection dated Apr. 19, 2013; 22 pages.
U.S. Appl. No. 12/257,641; Notice of Allowance dated Aug. 2, 2012; 17 pages.
U.S. Appl. No. 12/257,862; Non-Final Rejection dated Mar. 13, 2013; 30 pages.
U.S. Appl. No. 13/460,507; Non-Final Rejection dated Apr. 26, 2013; 19 pages.
U.S. Appl. No. 13/614,585; Issue Notification dated May 1, 2013; 1 page.
U.S. Appl. No. 13/715,808; Non-Final Rejection dated Apr. 9, 2013; 36 pages.
U.S. Appl. No. 11/891,784, Notice of Allowance dated Jul. 18, 2012; 27 pages.
U.S. Appl. No. 11/974,775, Notice of Allowance dated Jun. 12, 2012; 15 pages.
U.S. Appl. No. 12/257,424, Final Rejection dated Jun. 13, 2012; 41 pages.
U.S. Appl. No. 12/257;641; Notice of Allowance dated Aug. 2, 2012; 17 pages.
U.S. Appl. No. 12/272,238; Notice of Allowance dated Jun. 8, 2012; 21 pages.
U.S. Appl. No. 12/257,424; Non-Final Rejection dated Jul. 8, 2013; 46 pages.
U.S. Appl. No. 12/257,862; Non-Final Rejection dated Aug. 23, 2013; 29 pages.
U.S. Appl. No. 13/715,808; Notice of Allowance dated Sep. 13, 2013; 27 pages.
U.S. Appl. No. 13/847,388; Non-Final Office Action dated Jul. 17, 2013; 54 pages.
U.S. Appl. No. 12/168,668; Final Rejection dated Jul. 11, 2012; 29 pages.
U.S. Appl. No. 13/460,507; Non-Final Refection dated Aug. 16, 2012; 28 pages.
U.S. Appl. No. 11/974,775; Corrected Notice of Allowability dated Aug. 31, 2012; 7 pages.
U.S. Appl. No. 12/257,574; Notice of Allowance dated Sep. 14, 2012; 25 pages.
U.S. Appl. No. 11/891,784; Issue Notification dated Sep. 26, 2012; 1 page.
U.S. Appl. No. 11/974,775; Issue Notification dated Sep. 26, 2012; 1 page.
U.S. Appl. No. 12/272,238; Issue Notification dated Oct. 3, 2012; 1 page.
U.S. Appl. No. 11/904,883; Non Final Rejection dated Oct. 11, 2012; 26 pages.
U.S. Appl. No. 12/257,574; Issue Notification dated Jan. 9, 2013; 1 page.
U.S. Appl. No. 12/257,641; Issue Notification dated Nov. 7, 2012; 1 page.
U.S. Appl. No. 13/150,725; Non-Final Rejection dated Nov. 26, 2012; 19 pages.
U.S. Appl. No. 13/460,507; Final Rejection dated Dec. 20, 2014; 14 pages.
U.S. Appl. No. 13/614,585; Notice of Allowance dated Dec. 11, 2012; 30 pages.
U.S. Appl. No. 12/257,624; Non-Final Rejection dated Oct. 16, 2013; 38 pages.
U.S. Appl. No. 12/391,503; Non Final Office Action dated Oct. 25, 2013; 23 pages.
U.S. Appl. No. 12/257,928; Non-Final Rejection dated Nov. 20, 2013; 35 pages.
U.S. Appl. No. 12/257,424; Final Rejection dated Nov. 21, 2013; 34 pages.
U.S. Appl. No. 12/257,862; Notice of Allowance dated Dec. 6, 2013; 21 pages.
U.S. Appl. No. 13/847,388; Non-Final Office Action dated Dec. 9, 2013; 34 pages.
U.S. Appl. No. 13/460,507; Notice of Allowance dated Dec. 20, 2013; 20 pages.
U.S. Appl. No. 13/715,808; Issue Notification dated Dec. 24, 2013; 1 page.
U.S. Appl. No. 11/904,883; Non Final Rejection dated Feb. 5, 2014; 19 pages.
U.S. Appl. No. 12/257,424; Non-Final Rejection dated Apr. 17, 2014; 39 pages.
U.S. Appl. No. 12/257,862; Issue Notification dated Apr. 9, 2014; 1 page.
U.S. Appl. No. 12/257,928; Notice of Allowance dated Mar. 6, 2014; 20 pages.
U.S. Appl. No. 13/460,507; Issue Notification dated Apr. 16, 2014; 1 page.
U.S. Appl. No. 13/612,558; Non-Final Rejection dated Apr. 11, 2014; 37 pages.
U.S. Appl. No. 13/847,388; Final Rejection dated Apr. 7, 2014; 36 pages.
U.S. Appl. No. 11/904,883; Non Final Rejection dated Jun. 10, 2014; 15 pages.
U.S. Appl. No. 12/070,909; Notice of Allowance dated Jul. 23, 2014; 33 pages.
U.S. Appl. No. 12/257,424; Notice of Allowance dated Aug. 11, 2014; 36 pages.
U.S. Appl. No. 12/257,624; Final Office Action dated May 13, 2014; 28 pages.

(56) References Cited

OTHER PUBLICATIONS

U.S. Appl. No. 12/257,928; Issue Notification dated Jun. 25, 2014; 1 page.
U.S. Appl. No. 12/391,503; Final Rejection dated Jun. 5, 2014; 39 pages.
U.S. Appl. No. 13/847,388; Non-Final Rejection dated Jul. 17, 2014; 39 pages.
U.S. Appl. No. 13/848,649; Non-Final Rejection dated Jul. 17, 2014; 21 pages.
U.S. Appl. No. 11/904,883; Notice of Allowance dated Oct. 8, 2014; 17 pages.
U.S. Appl. No. 12/070,909; Issue Notification dated Oct. 29, 2014; 1 page.
U.S. Appl. No. 12/168,668; Notice of Allowance dated Oct. 7, 2014; 31 pages.
U.S. Appl. No. 13/612,558; Notice of Allowance dated Sep. 16, 2014; 16 pages.
U.S. Appl. No. 11/904,883; Issue Notification dated Feb. 4, 2015; 1 page.
U.S. Appl. No. 12/168,668; Issue Notification dated Feb. 18, 2015; 1 page.
U.S. Appl. No. 12/257,424; Issue Notification dated Dec. 10, 2014; 1 page.
U.S. Appl. No. 12/257,624; Notice of Allowance dated Jan. 5, 2015; 18 pages.
U.S. Appl. No. 12/391,503; Non Final Office Action dated Jan. 22, 2015; 23 pages.
U.S. Appl. No. 13/612,558; Issue Notification dated Feb. 25, 2015; 1 page.
U.S. Appl. No. 13/848,649; Non-Final Rejection dated Dec. 29, 2014; 12 pages.

* cited by examiner

PRIOR ART

SYSTEM AND METHOD FOR PROVIDING LOCATION INFORMATION FOR ADDRESSED BASED E-911 CALLS TO PUBLIC SAFETY ANSWERING POINTS

BACKGROUND

The National Telecommunications Information Administration (NTIA) is the executive branch's advisory agency on telecommunications issues. In the early 1980s, this agency proposed a plan to raise awareness of a single emergency telephone number to the general public. From that program, the National Emergency Number Association (NENA), a non-profit organization, was created. NENA has since become a leading organization to improving technology and developing guidelines for 9-1-1 ("911") telephone calls (i.e., emergency telephone calls) to improve response by emergency rescue teams.

Telecommunications has been changing rapidly over the past several years, primarily since the development and growth of the mobile telephone industry and the Internet. New forms of telecommunications have been developing as well Tradition telecommunications were performed over the public switch telephone network (PSTN). A system to maintain location of subscribers of telecommunications companies operating on the PSTN was developed. Determining the location of subscribers of the telecommunication companies was relatively easy as the locations were known by the telecommunications companies or carriers due to installing the telephones, establishing billing, or otherwise. With the new forms of telecommunications, these telephones and devices (e.g., Internet Protocol (IP) telephones or voice over IP (VoIP) telephones) operate over the Internet and have subscriptions with non-traditional telecommunications carriers, such as Vonage®. When VoIP telephones are not purchased from the telecommunications carriers, but rather purchased from a retail store, there is no record of physical location where the VoIP telephone is being used. Not leaving location information for the VoIP telephone is a problem for 911 telephone calls as the location information cannot automatically be communicated to a 911 operator at a public-safety answering point.

In response to the problem of the VoIP telephones not having addresses associated with them for 911 telephone calls, via databases or otherwise, NENA has encouraged the telecommunications industry to develop a system to provide public-safety answering points (PSAPs) with location information for non-traditional telephone calls through the use of enhanced 911 ("E-911"). To accommodate the need to provide location information to public-safety answering points during E-911 telephone calls, a number of solutions have been developed by different telecommunications groups.

Figure 1:
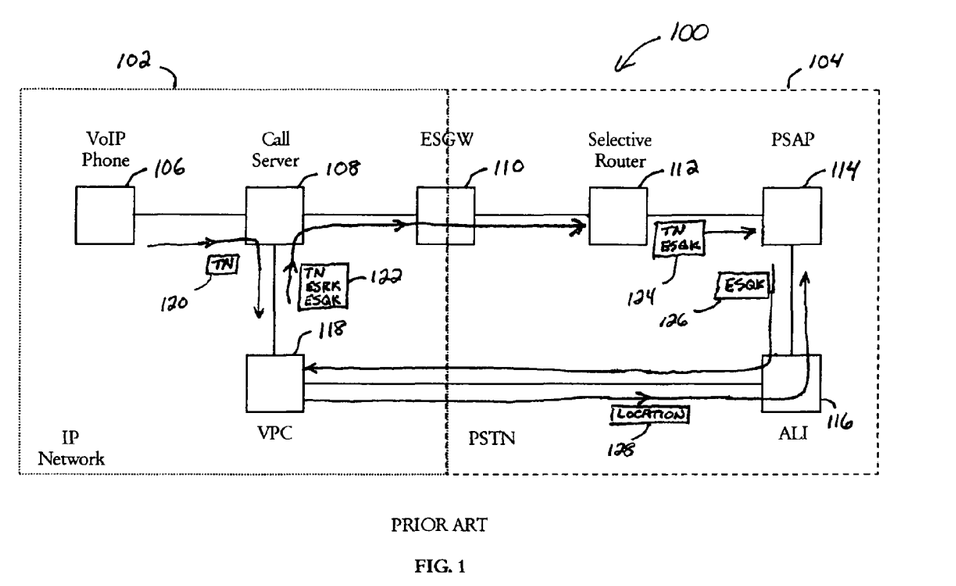
FIG. 1 is a block diagram of a conventional system for determining location of a VoIP telephone during an E-911 telephone call.

FIG. 1 is a block diagram of a conventional system configuration for storing and reporting physical locations (e.g., street addresses) of VoIP telephones to public-safety answering points. As shown, there are two networks in communication with one another, an IP network 102 and the PSTN 104. Within the IP network 102 is a VoIP telephone 106 and a call server 108, which receives calls from the VoIP telephone. Between the IP network 102 and PSTN 104 is an emergency service gateway 110 that converts data packets as communicated over VoIP network 102 into signals for communication over PSTN 104. Within the PSTN 104 are selective routers 112 and public-safety answering points 114. Although only one selective router 112 and public-safety answering point 114 are shown, it should be understood that there are many selective routers 112 and thousands of public-safety answering points located on the PSTN 104 in the United States. An automated location identifier (ALI) 116 is a system that enables the automatic display at the public-safety answering point of a caller's telephone number, the address/location of the telephone, and supplementary emergency services information. A VoIP positioning center (VPC) 118 is a database that maintains and manages emergency servers routing keys (ESRK), emergency service query keys (ESQK), and locations of VoIP telephones. The VoIP position center 118 is located on the IP network 102 and is configured to communicate over the PSTN 104.

In operation, when a user places an E-911 telephone call using the VoIP telephone 106, a signal 120, including a telephone number associated with a VoIP telephone 106, is communicated to the call server 108. The call server 108, in response, communicates the signal 120 to the VoIP position center 118. In response, the VoIP position center 118 communicates a signal 122, including the telephone number, emergency service routing key (ESQK), which causes the call to be routed to a local selective router and emergency service query key (ESQK), which causes the correct location information to be queried for display at the public-safety answering point 114 to the call server 108. The call server 108, in turn, communicates the signal 122 to the emergency service gateway 110. Based on the emergency service routing key, the emergency service gateway 110 communicates the signal 122 to the appropriate selective router 112 in an area near the VoIP telephone 106. The selective router 112 determines which public-safety answering point 114 is physically located near the VoIP telephone 106 and communicates the telephone number and emergency service query key in a signal 124 to the public-safety answering point 114.

The public-safety answering point 114 communicates the emergency service query key in a signal 126 to the automated location identifier 116, which, in turn, communicates the emergency service query key to the VoIP positioning center 118. The VoIP positioning center 118 looks up the address associated with the VoIP telephone 116 in a database using the emergency service query key and communicates the location, which may include an address, apartment, office number, or other information associated with the VoIP telephone 106, in a signal 128 to the automated location identifier 116. The automated location identifier 116 communicates the location information to the public-safety answering point 114 for display to an operator who answers the telephone call from the user of the VoIP telephone 106. The operator is then able to determine the specific location of the VoIP telephone 106 and communicate that information to emergency services, such as firefighters and policemen, who respond to the E-911 telephone calls.

There are problems that exist with the configuration of system 100. First, the VoIP positioning center 118 is a database that is very expensive to create and maintain. Second, communications between the automated location identifier 116 and VoIP positioning center 118 require two dedicated trunks, one for communications from the automated location identifier 116 to the VoIP positioning center 118 and one from the VoIP positioning center 118 to the automated location identifier 116. It is understood that the operation for deploying and maintaining these trunks is expensive. Third, entering information into a database located at the VoIP positioning center 118 is complicated. For at least these reasons, there is a need for an improved system for maintaining location information associated with VoIP telephones.

SUMMARY

To overcome the problems of existing network configurations for handling addressed based E-911 telephone calls from VoIP telephones, the principles of the present invention provide for a network configuration that is less expensive and easier to manage than current systems. The principles of the present invention use a database for storing location information associated with VoIP telephones. In one embodiment, the database used to store the location information is a calling name database. Alternatively, the database may be a third party database. To collect the location information, an interactive voice response system may be used in conjunction with a calling name database, which is generally used for caller identification (ID). Upon a public-safety answering point receiving an E-911 telephone call from a VoIP telephone, the location information may be requested by the public-safety answering point from the database.

One embodiment of a system configured in accordance with the principles of the present invention includes a system for providing location information to a public-safety answering point during an E-911 telephone call by a person using a voice over Internet Protocol (VoIP) telephone. The system may include a database configured to store location information associated with subscribers of a VoIP telephone service. A database access server may be in communication with the database. A media gateway and emergency service gateway may be in communication with an Internet protocol (IP) network A telephone switch may be in communication with the database access server, media gateway, and emergency service gateway. A selective router may be in communication with the telephone switch. A public-safety answering point may be in communication with the selective router. A call server may be in communication with a VoIP telephone and be configured to (i) receive a telephone call from a VoIP telephone, (ii) determine if the call is a non-emergency call or an E-911 call, and (iii) determine if the call is a non-emergency call, and, if so, then route the call to the media gateway, otherwise, route the call to the emergency service gateway to cause the VoIP telephone to be in communication with the public-safety answering point. In response to receiving the E-911 call, the public-safety answering point may further be configured to (i) request location information associated with the VoIP telephone from the database via the telephone switch and database access server, (ii) receive the location information associated with the VoIP telephone, and (iii) display the location information.

A method operating in accordance with the principles of the present invention may include receiving an E-911 telephone call from a VoIP telephone. Location information associated with the VoIP telephone stored in a database may be requested. The location information may be received in a signal formatted substantially the same as a signal format for communicating caller identification information. The location information may be displayed at a public-safety answering point. In one embodiment, the location information may be displayed on a video display (e.g., computer screen). Alternatively, the location information may be displayed on a telephone display.

In another embodiment, a system for providing location information to a public-safety answering point during an E-911 telephone call by a person using a voice over Internet Protocol (VoIP) telephone may be provided. The system may include a database access server in communication with an Internet protocol (IP) network and configured to (i) receive a request from a public-safety answering point in communication with the public switched telephone network (PSTN) to obtain location information of a user of a VoIP telephone, (ii) request location information of the VoIP telephone from a database, (iii) receive the location information from the database, and (iv) communicate the location information to the public-safety answering point.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF DRAWINGS

Figure 2:
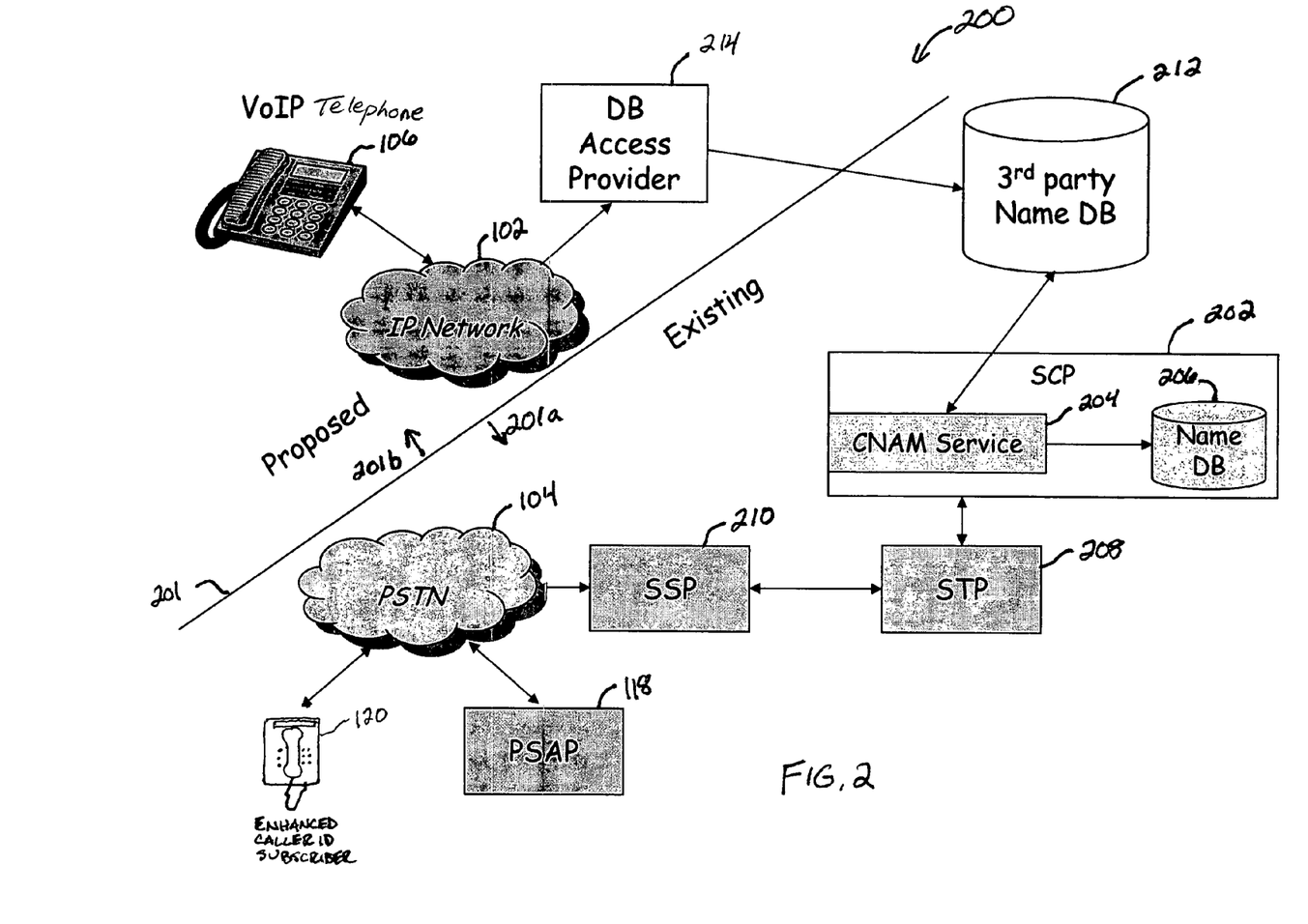
FIG. 2 is a block diagram of an exemplary system configured for providing a public-safety answering point with location information of a VoIP telephone.

FIG. 2 is a block diagram of an exemplary system 200 configured for providing a public-safety answering point 118 with location information of a VoIP telephone 106. The VoIP telephone 106 is in communication with the IP network 102 and the public-safety answering point 118 is in communication with the PSTN 104. As shown, a dividing line 201 extends between two portions of the system 200, where the right half 201a includes an existing or convention configuration with, optionally, a few exceptions described herein below, and the left half 201b includes aspects of the system 200 that provide for the location information of the VoIP caller 106 to be communicated to the public-safety answering point 118. Enhanced caller ID subscribers 120 may be in communication with the PSTN 104. When the enhanced caller ID subscriber 120 calls the public-safety answering point 118, the public-safety answering point 118 receives location information of the subscriber 120 if public-safety answering point 118 is also using telecommunications telephone terminal equipment following TIA/EIA-777 standards.

A service control point 202, which is operated by a telecommunications carrier, includes a calling name service 204 and name database 206. The calling name service 204 may be a server that provides an interface with the name database 206, where the name database 206 stores names and telephone numbers that are typically used for type II caller ID purposes, as understood in the art.

As understood in the art, signaling system 7 (SS7) is a network architecture for performing out-of-band signaling in support of the call-establishment, billing, routing, and information-exchange functions of the public switched telephone network (PSTN). A signal transfer point (STP) 208, which is a switch that relays messages between network switches and databases, routes SS7 messages to the correct outgoing signaling links based on SS7 message address fields. A signal switching point (SSP) 210 is in communication with the PSTN 104 and STP 208. The SSP 210 is a telephone switch that interconnects SS7 links and performs call processing on telephone calls that originate, tandem, or terminate at the SSP 210. The SSP 210 generates SS7 messages to transfer call-related information to other SSPs or to query the SCP 202 for routing instructions.

The service control point 202 may be in communication with a third party name database 212. The third party name database 212 may store names and telephone numbers of subscribers of other service providers for performing caller ID functionality. This third party name database 212 is typically managed by a third party, which may be a service provider other than a telecommunications carrier.

As described in connection with FIG. 1, a network architecture has been developed to handle location identification for VoIP telephones 106. A database access provider 214 may include a database access server 215 for managing communications to and from the third party database 212. The database access provider 214 may be in communication with the IP network 102 and third party name database 212. In one embodiment, the database access provider 214 communicates with the third party name database 212 via the IP network. Alternatively, the database access provider 214 may communicate with the third party name database 212 via the PSTN or a dedicated trunk. The database access provider 214 may be (i) a telecommunications carrier, (ii) the same third party that manages the third party name database 212, or (iii) another third party database manager. The database access provider 214 may perform the function of communicating with the VoIP telephone 106 so that subscribers of a telecommunications carrier who purchase VoIP telephones and use the telephone in conjunction with their IP network connections (e.g., computer that interfaces with the Internet) can establish their physical address or location information within a database, in this case, the third party name database 212. The location information may later be looked up during an address based E-911 telephone call by the public-safety answering point 118.

Figure 3:
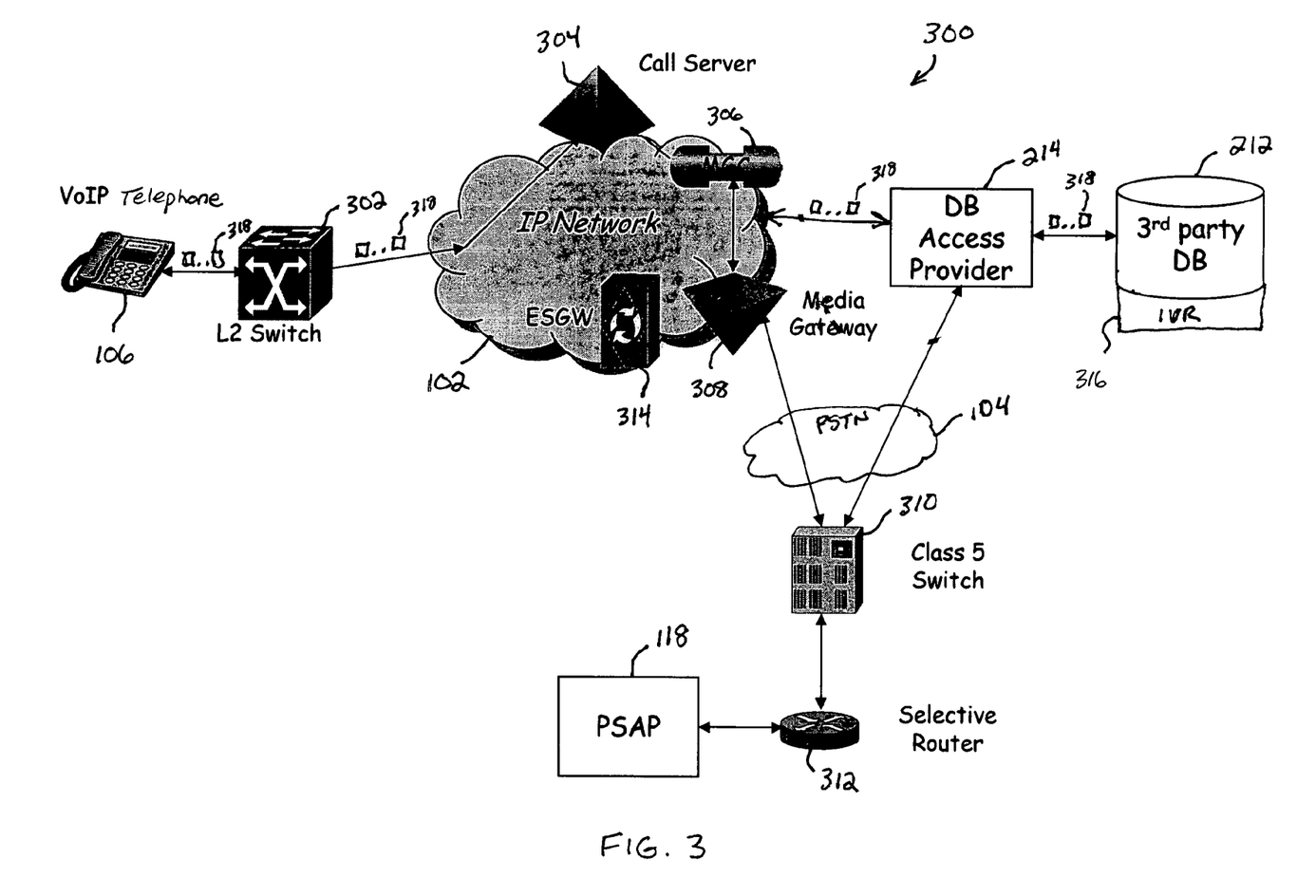
FIG. 3 is an illustration of an exemplary network architecture as configured in accordance with FIG. 2.

FIG. 3 is an illustration of an exemplary network architecture 300 as configured in accordance with FIG. 2. In one embodiment, the network architecture 300 includes the VoIP telephone 106 that communicates with a layer 2 (L2) switch 302 for communicating an IP telephone call over the IP network 102. A call server 304, which may operate as a router, may be connected to the IP network 102 and be configured to receive and route IP telephone calls. A media gateway controller 306 and media gateway 308 may also be in communication with the IP network 102 and be utilized to convert signals formatted to communicate over the IP network 102 to signals formatted to communicated over the PSTN 104. An emergency services gateway may also be connected to the IP network for receiving address based E-911 telephone calls and routing the calls to a public-safety answering point 118.

Connected to the PSTN is a class 5 switch 310 that is in communication with a selective router 312. The selective router 312, as previously described, may be one of many located in the United States and be located in a local region as the VoIP telephone 106. The public-safety answering point 118, which, too, may be in the local region of the VoIP telephone 106, may be in communication with the selective router 312. The database access provider 214 may be in communication with both the IP network 102 and PSTN 104 and communicate with the third party database 212. In one embodiment, the third party database 212 may include an interactive voice response system (IVR) 316 that is utilized to prompt a user with voice commands to enter location information (e.g., address) using a voice or keypad response.

In operation, a user may register location information associated with the VoIP telephone 106 by calling a registration telephone number. The telephone call may be communicated using IP data packets 318. The registration telephone number may be associated with the third party database 212 so that information submitted via the telephone call can be input and stored in the third party database 212. In one embodiment, the registration telephone number calls the database access provider 214 via the IP network 102. The interactive voice response system 316 may be accessed and the user may respond to one or more prompts to speak or type via a keypad the user's location information. For example, the user may be prompted to speak his or her street address, street name, city, or any other information that would be helpful in an emergency situation for rescuers to locate a victim. As shown, a user may register the VoIP telephone 106 by calling the third party database 212 via the L2 switch 302, call server 304, database access provider 214, and third party database 212. Alternatively, the call server may route the call via the media gateway 308 and class 5 switch 310 to the database access provider 214. It should be understood that rather than the database access provider 214 being the intermediary to the third party database 212, another intermediary, such as a server at a telecommunications carrier. It should further be understood that if a subscriber of the VoIP telephone 106 purchases the telephone directly from the telecommunications carrier, that the telecommunications carrier may populate the third party database 212 with the location information of the VoIP telephone, if provided by the subscriber.

While the subscriber of the VoIP telephone 106 may use an interactive voice response system 316 to register location information into the third party database 212, it should be understood that a website (not shown) may be established to allow the subscriber to enter the location information via a graphical user interface (GUI). The website may be operated by the database access provider 214 or another operator. Any other method for populating the third party database 212 with location information of the VoIP telephone 106 may be performed.

Figure 4:
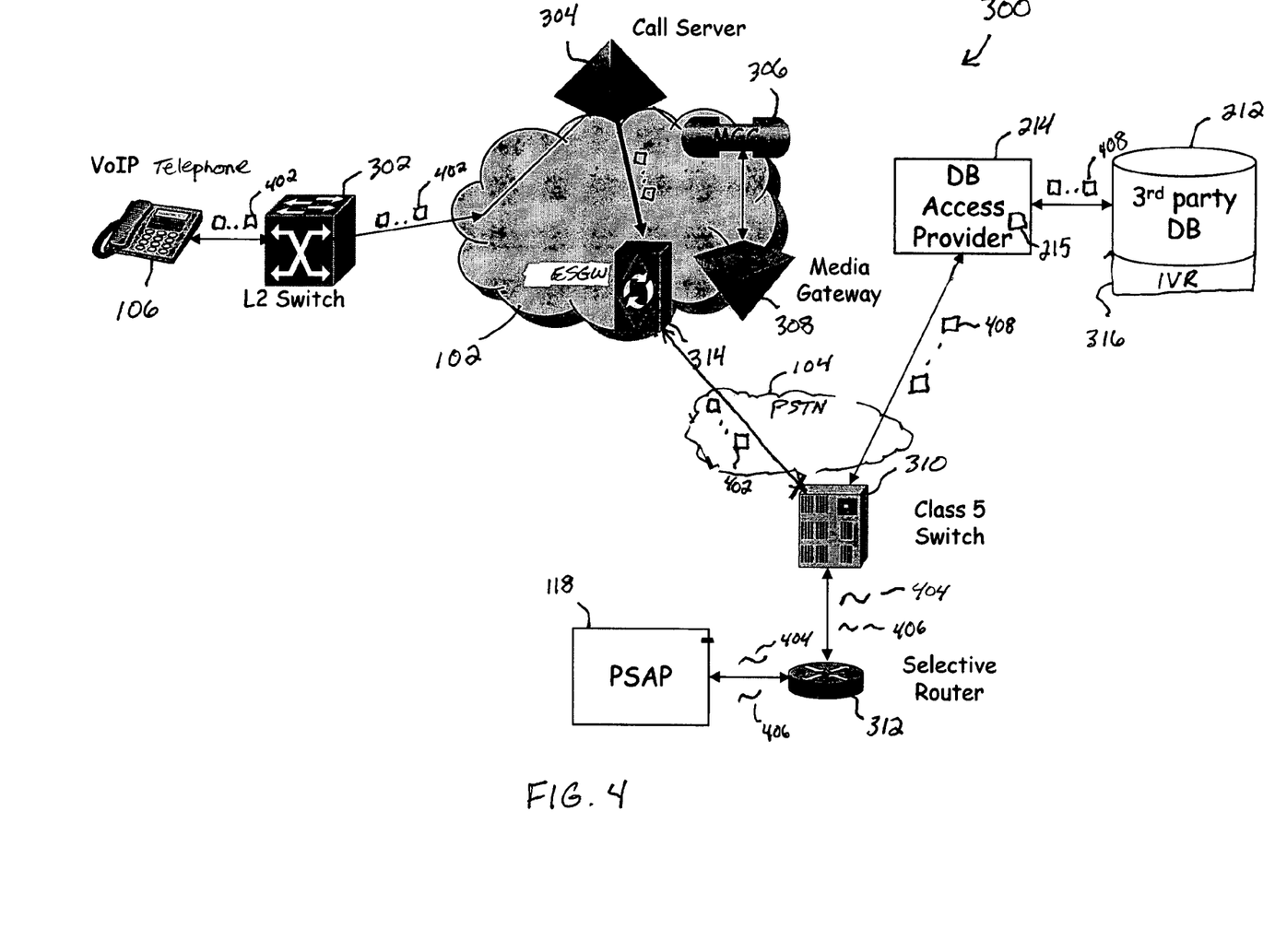
FIG. 4 is an illustration of the exemplary network architecture of FIG. 3 as configured during an emergency telephone call from the VoIP telephone.

FIG. 4 is an illustration of the exemplary network architecture 300 of FIG. 3 as configured during an address based E-911 telephone call from the VoIP telephone 106. When the E-911 telephone call is placed from the VoIP telephone 106, IP data packets 402 are communicated from the VoIP telephone 402 to the L2 switch 302. The L2 switch communicates the IP data packets 402 to the call server 304, which determines that an address based E-911 telephone call is being placed. In response to determining that the telephone call is an E-911 telephone call, the call server 304 routes the IP data packets 402 to the emergency service gateway 314. The emergency service gateway 314, which may include the same or similar functionality as the media gateway 308 for communicating the IP data packets 402 over the PSTN to the class 5 switch 310, may determine the correct public-safety answering point 118 to mute the call and communicate the public-safety answering point 118 via a local class 5 telephone switch 310. The class 5 switch 310 converts the IP data packets 402 to a frequency shift keying signal 404 for delivery to the public-safety answering point 118 via the selective muter 312. The public-safety answering point 118 may use enhanced caller ID enabled telecommunications equipment that is compliant with TIA/EIA-777 Type II or higher telecommunications equipment to receive and display caller ID information from enhanced caller ID signaling in a frequency shift keying format. If the public-safety answering point 118 does not have TIA/EIA-777 Type II or higher telecommunications equipment (i.e., equipment capable of receiving enhanced caller ID signaling), such telecommunications equipment may be provided to the public-safety answering point 118 to replace or operate in parallel with existing telecommunications equipment.

The IP data packets 402 may include a query key or other identifier that may be used by the public-safety answering point 118 to request location information of the VoIP telephone 106 from the third party database 212. The public-safety answering point 118, in response, may request the location information from the third party database 212 by communicating a signal 406 through the class 5 switch 310. The class 5 switch 310 may convert the signal 406 to data packets 408 to be communicated to the third-party database 212 via the database access provider 212. In response to the request, the third party database 212 may look-up the location information associated with the VoIP telephone 106 and communicate the location information back to the class 5 switch 310, which, in turn, converts the location information into a frequency shift keying signal, the same or similar to signal 404, or other signal compatible with the telecommunications equipment at the public-safety answering point 118 for communication to the public-safety answering point 118.

Figure 5:
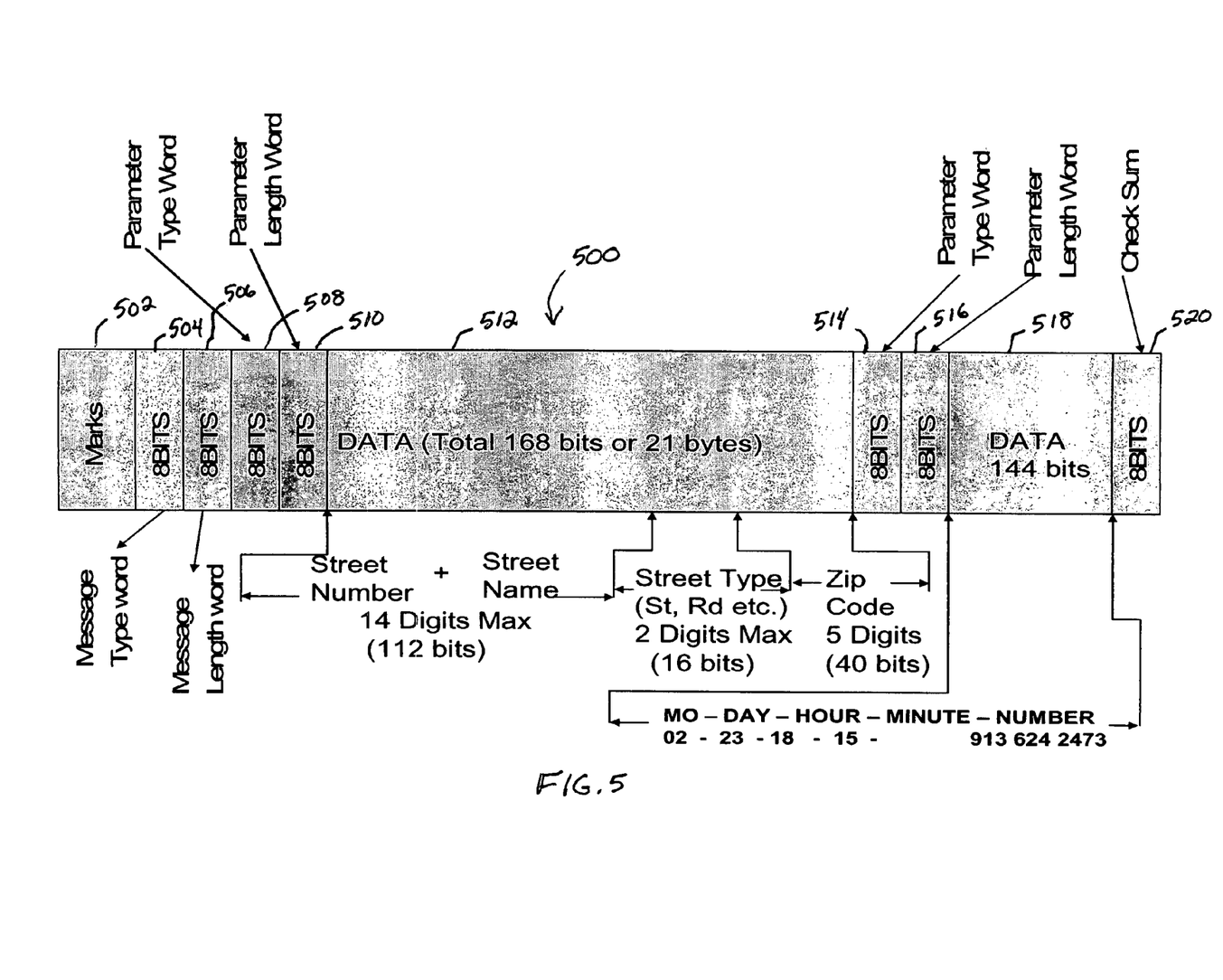
FIG. 5 is a block diagram of an exemplary frequency shift keying signaling structure that may be utilized in accordance with the principles of the present invention.

FIG. 5 is a block diagram of an exemplary frequency shift keying signaling structure 500 that may be utilized in accordance with the principles of the present invention. This signaling structure or format 500 may be the same or substantially the same signaling structure as a conventional caller ID signaling structure, as understood in the art. The signaling structure 500 includes a number of fields, including marks 502, message type 504, message length 506, parameter type 508, parameter length 510, data 512, parameter type 514, parameter length 516, data 518, and check sum 520. Although the signaling structure 500 is configured for caller ID information, such as name and telephone number to be included in data fields 512 and 518, which are 168 bits (21 characters) and 144 bits (18 characters), respectively, the principles of the present invention provide for including street number and street name (14 characters—112 bits), street type (2 characters—16 bits), and zip code (5 digits—40 bits) in the first data field 512 and date, time, and phone number in the second data field.

Figure 6:
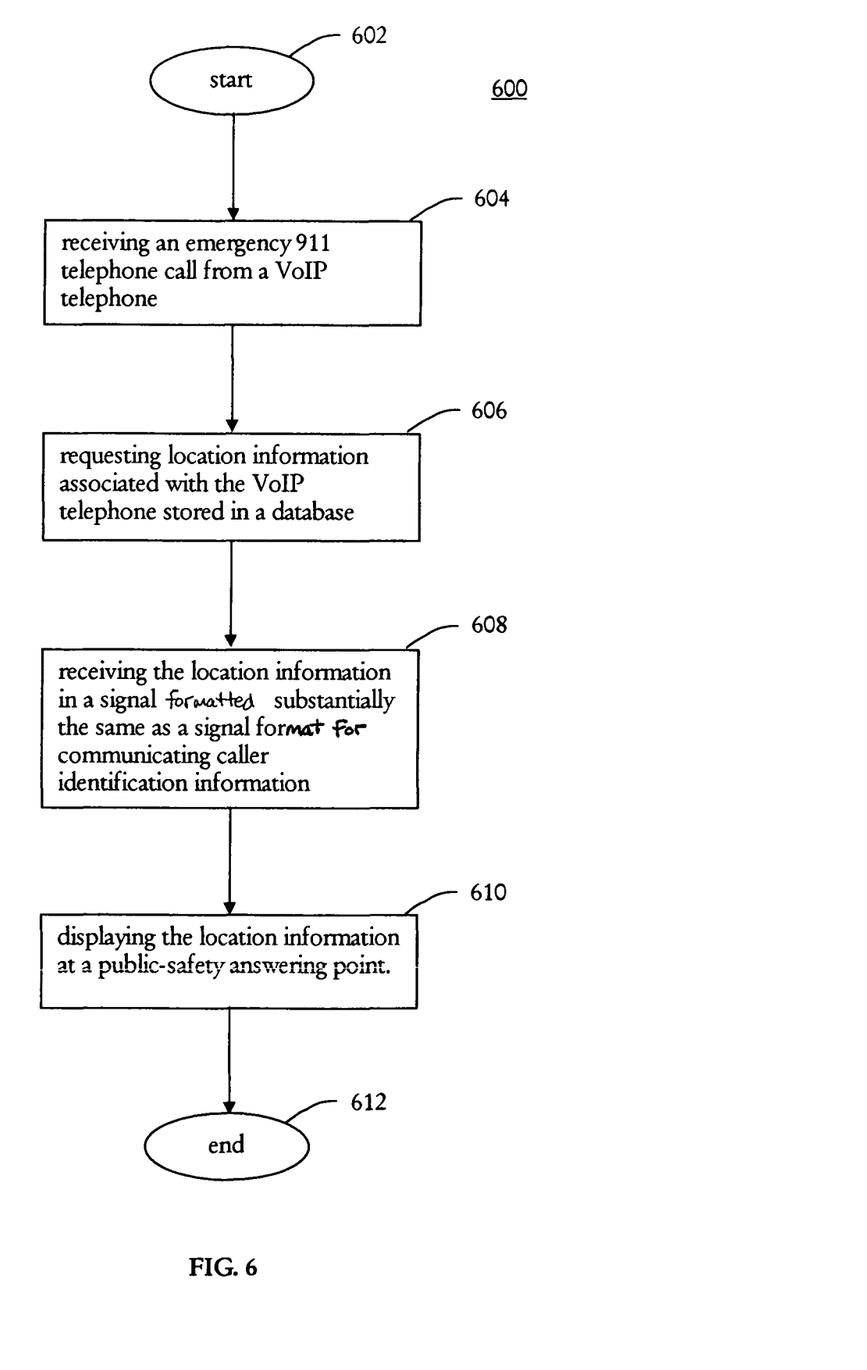
FIG. 6 is a flow diagram of an exemplary process for communicating location information of a VoIP subscriber to a public-safety answering point.

FIG. 6 is a flow diagram of an exemplary process 600 for communicating location information of a VoIP subscriber to a public-safety answering point. The process 600 starts at step 602. At step 604, an E-911 telephone call from a VoIP telephone may be received. In response to the E-911 telephone call, location information associated with the VoIP telephone stored in a database may be requested at step 606. In one embodiment, the location information is requested by the public-safety answering point from a database that stores the location information. The location information may be stored by a third party database and/or within a calling name database. At step 608, the location information may be received in a signal formatted substantially the same as a signal format for communicating caller identification information. The location information may be displayed at the public-safety answering point at step 610, and the process 600 ends at step 612. In one embodiment, a subscriber of a telecommunications provider using the VoIP telephone may be prompted by an interactive voice response prompt requesting the location information.

More specifically, the address parameter may be ASCII equivalent of the characters that represent the address associated with the calling access line. The character subfields may be coded in 8 bit ASCII (no parity) with one octet per character. No characters (e.g., spaces, commas, periods, etc.) are assumed and the relevant characters are sent. The first character of the address may be transmitted first and subsequent characters may be transmitted in order until the last character is transmitted. For example, the address "12345 John Rd" may be coded over 12 octets as 00110001, 00110010, 00110011, 00110100, 00110101, 01001010, 01001111, 01001000, 01001110, 00100000 (space), 01010010, and 01000100. If the street number plus the street name combined is more than 14 characters, then the characters after 14 characters are ignored by the system. If the street number plus the street name combined occupies 11 characters then one space may be put before the street name, one space before the street type, and another space before the street code. If the street number plus the street name combined occupies 12 characters, then one space may be put before the street name and another space may be put before the zip code. If the street number plus the street name combined occupies 13 characters, then one space may be put before the street name. To minimize the total length of the displayed address message on the public-safety answering point side, no more than one space is put before the street name, street type, or zip code. If the street number plus the street name combined occupies 14 characters, then no spaces are included. Additional description of the signaling structure 500 and communication thereof is described in co-pending patent application having Ser. No. 11/430,232 filed May 8, 2006, which is incorporated herein by reference in its entirety.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for providing location information to a public-safety answering point during a 911 telephone call by a person using a voice over Internet Protocol (VoIP) telephone, said system comprising:
   a database managed by a third party other than a telecommunications carrier providing a VoIP telephone service, the database being configured to store location information associated with subscribers of the VoIP telephone service, wherein said location information is registered by the subscribers through a website and graphical user interface;
   a database access server in communication with said database;
   a media gateway in communication with an Internet protocol (IP) network;
   an emergency service gateway in communication with the IP network;
   a telephone switch in communication with said database access server, said media gateway, and said emergency service gateway;
   a selective router in communication with said telephone switch;
   a public-safety answering point in communication with said selective router;
   a call server in communication with a VoIP telephone and configured to:
      receive a telephone call from a VoIP telephone;
      determine if the call is a non-emergency call or a 911 call, and
         if the call is a non-emergency call, then route the call to the media gateway, otherwise, route the call to the emergency service gateway to cause the VoIP telephone to be in communication with said public-safety answering point;

in response to receiving the 911 call, said public-safety answering point is further configured to:
 request location information associated with the VoIP telephone from said database via said telephone switch and database access server;
 receive the location information associated with the VoIP telephone; wherein the location information is communicated in a signal configured the same as a signal for communicating caller identification information, and wherein the location information signal comprises a first data field of 168 bits of data and a second data field of 144 bits of data, and wherein the first data field comprises data representing a street address and zip code and the second data field comprises data representing a time, date and telephone number; and display the location information.

2. The system according to claim 1, wherein said telephone switch is a class 5 switch.

3. The system according to claim 1, wherein said database access server is configured to receive the location information from said database and communicate the address information in data packets to said telephone switch.

4. The system according to claim 3, wherein said telephone switch is configured to receive the location information from said database access server and communicate the location information to said public-safety access provider via a frequency shift keying signal.

5. The system according to claim 4, wherein the frequency shift keying signal is configured with data fields the same as used to communicate caller ID information.

6. The system according to claim 5, wherein the data fields are filled with the location information.

7. The system according to claim 1, wherein said database is not managed by a telecommunications carrier.

8. The system according to claim 1, further comprising an interactive voice response system in communication with said database, said interactive voice response system operable to prompt a subscriber using the VoIP telephone for the location information and configured to store the location information in said database.

9. A method for providing location information to a public-safety answering point during a 911 telephone call by a person using a voice over Internet Protocol (VoIP) telephone, said method comprising:
 providing a database managed by a third party other than a telecommunications carrier providing a VoIP telephone service, the database being configured to store location information associated with subscribers of the VoIP telephone service, wherein said location information is registered by the subscribers through a website and graphical user interface;
 providing a database access server in communication with said database;
 providing a media gateway in communication with an Internet protocol (IP) network;
 providing an emergency service gateway in communication with the IP network;
 providing a telephone switch in communication with said database access server, said media gateway, and said emergency service gateway;
 providing a selective router in communication with said telephone switch;
 providing a public-safety answering point in communication with said selective router;
 providing a call server in communication with a VoIP telephone and configured to:
  receive a telephone call from a VoIP telephone;
  determine if the call is a non-emergency call or a 911 call, and
   if the call is a non-emergency call, then route the call to the media gateway,
   otherwise, route the call to the emergency service gateway to cause the VoIP telephone to be in communication with said public-safety answering point;
 in response to receiving the 911 call, said public-safety answering point is further configured to:
  request location information associated with the VoIP telephone from said database via said telephone switch and database access server;
  receive the location information associated with the VoIP telephone; wherein the location information is communicated in a signal configured the same as a signal for communicating caller identification information, and wherein the location information signal comprises a first data field of 168 bits of data and a second data field of 144 bits of data, and wherein the first data field comprises data representing a street address and zip code and the second data field comprises data representing a time, date and telephone number; and display the location information.

10. The method according to claim 9, wherein said telephone switch is a class 5 switch.

11. The method according to claim 9, wherein said database access server is configured to receive the location information from said database and communicate the address information in data packets to said telephone switch.

12. The method according to claim 11, wherein said telephone switch is configured to receive the location information from said database access server and communicate the location information to said public-safety access provider via a frequency shift keying signal.

13. The method according to claim 12, wherein the frequency shift keying signal is configured with data fields the same as used to communicate caller ID information.

14. The method according to claim 1, wherein the data fields are filled with the location information.

15. The method according to claim 9, wherein said database is not managed by a telecommunications carrier.

16. The method according to claim 9, further comprising providing an interactive voice response system in communication with said database, said interactive voice response system operable to prompt a subscriber using the VoIP telephone for the location information and configured to store the location information in said database.

* * * * *